Figure 3:
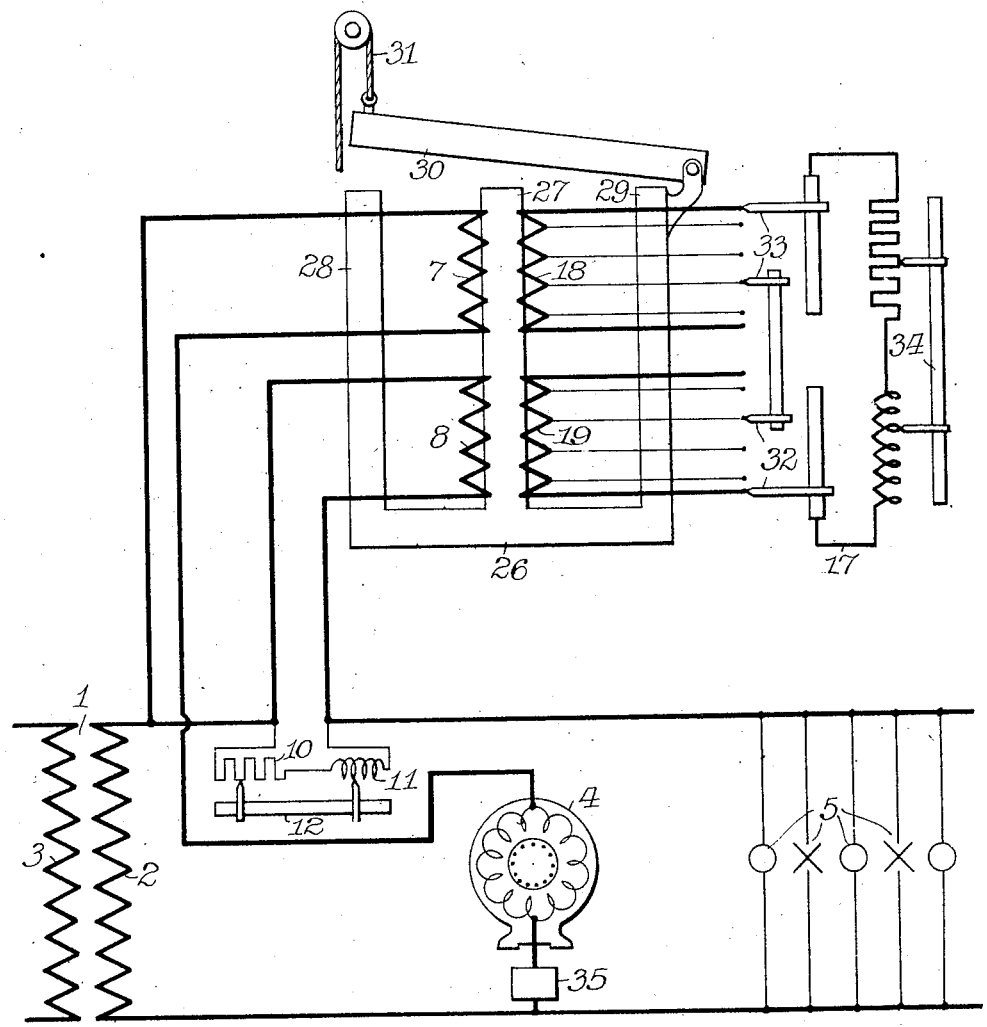

E. O. SCHWEITZER.
SYSTEM OF DISTRIBUTION.
APPLICATION FILED AUG. 28, 1914.
1,162,405.
Patented Nov. 30, 1915.
2 SHEETS—SHEET 1.
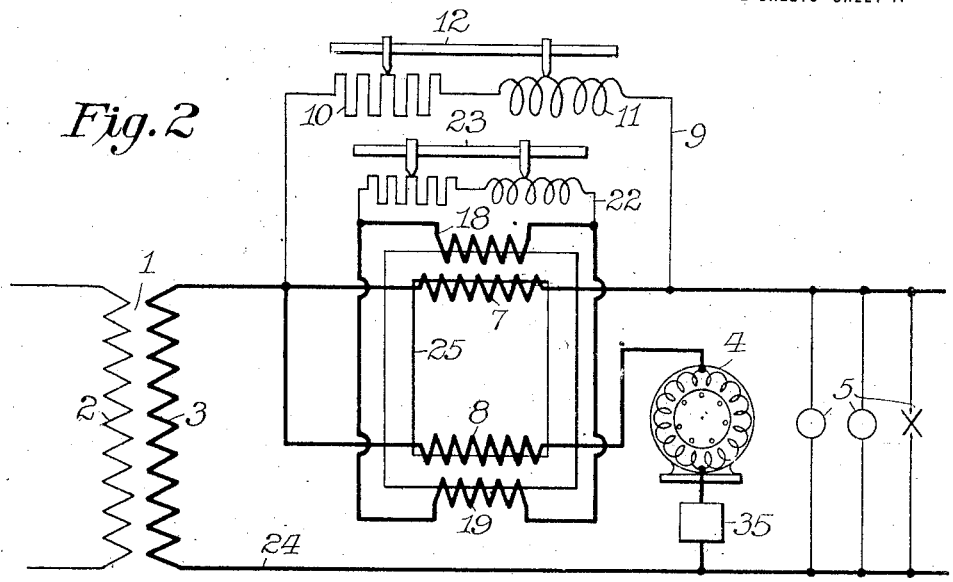
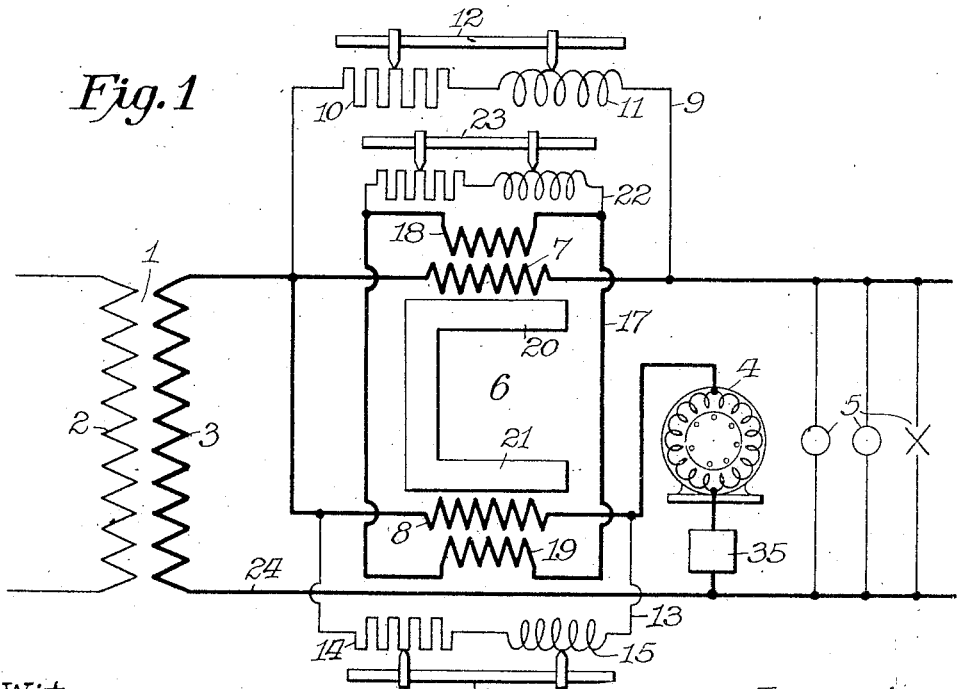
Witnesses:
Leonard W. Novander.
John A. Wirnnr
Inventor
Edmund O. Schweitzer
By Brown, Hanson & Boettcher
Attys

UNITED STATES PATENT OFFICE.

EDMUND O. SCHWEITZER, OF CHICAGO, ILLINOIS.

SYSTEM OF DISTRIBUTION.

1,162,405.   Specification of Letters Patent.   Patented Nov. 30, 1915.

Application filed August 28, 1914. Serial No. 859,038.

*To all whom it may concern:*

Be it known that I, EDMUND O. SCHWEITZER, a citizen of the United States, and resident of Chicago, in the county of Cook and State of Illinois, have invented a certain new and useful Improvement in Systems of Distribution, of which the following is a full, clear, and exact description, reference being had to the accompanying drawings, forming a part of this specification.

The subject-matter of this invention is a system of distribution.

In my copending application, Serial No. 852,629, filed July 23, 1914, I have described a system of distribution in which it is possible to feed from the same transformer one branch circuit containing electric lamps, or other devices which require a fairly steady voltage, and another branch or branches including a variable voltage device such as an induction motor. The above-described system is eminently satisfactory for a fixed lamp load regardless of the variations of current taken by the motor load, but compensation becomes imperfect when the lamp load itself is varied.

It is the object of the present invention to provide a system of distribution for feeding from a given source of power loads of different characteristics, one of which shall consist of constant voltage devices, the carrying mains for which loads are so related as to maintain a constant voltage upon the constant-voltage devices under all reasonable variations of the amount of current drawn by either or both loads.

In the accompanying drawings—Figure 1 illustrates a system of distribution embodying the principles of my invention; Fig. 2 is a diagram of a modified system; and Fig. 3 is a diagram of a further modification.

In the system shown in Fig. 1, it is proposed to supply current from a transformer 1, having the primary or line-winding 2 and the secondary or feeder winding 3, to an induction motor 4, or other variable current device, and to lamps 5 or other constant-voltage devices. It is well-known that the induction motor can be operated upon varying voltages as the only effect of a lower voltage will be a decrease in speed. The characteristics of electric lamps, especially of the incandescent types, is such that any considerable variation in voltage is not permissible. If the voltage is lowered, the illuminating power is very greatly decreased and, if the voltage is increased, the life of the lamp is unfavorably affected. The secondary winding of the transformer 1 is connected through a compensating transformer 6 to the various loads in such a manner that all the constant-voltage devices 5 are fed in series through one winding 7 of this transformer and all the variable-current devices 4 are connected in series with the winding 8 of the compensating transformer. The relation of the windings 8 and 7 is such that an increase of current through the variable-current devices will cause sufficient additional voltage to be generated in the winding 7 to compensate for the IR and IX drops in the winding 3 of the main transformer. By providing a suitable shunt 9 around the winding 7, I am enabled to obtain a suitable characteristic for the compensating transformer, so that the effective voltage induced in the winding 7 is not only substantially proportional to the amount of current flowing in the winding 8 in series with the variable current devices 4, but is also correct in amount to compensate for the IR and IX drops. If the ratio of the effective voltage induced in winding 7 is in proportion to the current flowing in the winding 8, then, it can be seen that for substantially all values of current in the motor circuit due compensation can be secured in the lamp circuit. The shunt 9 is provided with resistance 10 and inductance 11, which may be cut out of circuit by means of a slider 12, or other switching arrangement. The proportion of current flowing through the winding 8 may also be adjusted by means of a shunt 13, containing resistance 14 and inductance 15. The relative amounts of resistance and inductance included in circuit may be controlled by slider 16.

The arrangement so far described can be adjusted accurately for all variations of current through the motor circuit with a given lamp load in the lamp circuit, that is, compensation may be practically perfect, but inherent regulation of the lamp circuit will be poor. This is because any excess current flowing in the lamp circuit will tend to boost the voltage in the motor circuit, this having a detrimental effect upon the lamp voltage. It is, therefore, desirable to introduce some element, or a number of elements, which will allow a return of the energy which would be shifted over to the motor circuit by increased current in the lamp circuit, or which will independently transfer energy from the motor circuit to the lamp circuit. It can be seen that if the effect of preventing a transfer of energy could be accomplished, the inherent regulation in the lamp circuit would be improved.

I have illustrated in the figures one general scheme for preventing a transfer of energy from the lamp circuit to the motor circuit upon increase of current in the lamp circuit. It is to be understood that the scheme that I have proposed is not the only possible means, as I have illustrated this particular embodiment of the invention only for the purpose of complying with the statutes, and any means which will produce the results of improving the inherent regulation of the lamp circuit, either by returning part of the energy which is transferred to the motor circuit, or by preventing its transference, comes broadly within the spirit and scope of my invention. In Fig. 1, the means shown for accomplishing this general purpose is the closed circuit 17, including the windings 18 and 19. The winding 18 is wound closely over the winding 17, which, in turn, is wound upon the limb 20 of the transformer core. The winding 19 is wound over the winding 8, which is wound upon the limb 21 of the transformer core. I have shown the core 6 of the transformer as comprising an open magnetic circuit. This is for the purpose of allowing the circuit 17 to operate in the manner above described, as leakage in the transformer between the windings 7 and 8 is essential to the proper operation of the device. The winding 18 may be shunted by a circuit 22 controlled by a slider 23. The winding 19 may also be so adjusted, if desired. The windings 7 and 18 are so disposed that very little magnetic leakage between these two windings is possible. In the same manner, the windings 8 and 19 are closely related in order that a substantially exact ratio between the voltages of these windings shall obtain. In effect, increase of current would tend to transfer energy through the iron core of the transformer to the motor circuit, but sufficient current circulates through the circuit 17 to return such increase to the lamp circuit. In substance, the above are the tendencies, although the operation of the device may be simply such as to prevent such transfer of energy, only sufficient current circulating through the circuit 17 to maintain the proper relation between the two load circuits. The purpose of the closed circuit including the windings 18 and 19 is to improve the characteristics of the lamp circuit independently of the motor circuit. This is accomplished by the short circuit effect caused by the combined action of the magnetic circuit and the closed electric circuit. When the motor winding is inactive the structure may be considered as a transformer having a short circuit winding thereupon. This practically eliminates the inductance of transformer winding 8 from the lamp circuit when the motor circuit is inactive. It is to be understood that the amount of compensation is determined primarily by the transformer ratio and the respective currents flowing through the motor and through the lamp. By varying the number of turns to obtain the required degree of asymmetry proper compensation can be secured. The system shown in Fig. 2 is substantially the same as that shown in Fig. 1 with the exception that I have shown a transformer 25 having a closed magnetic circuit. The iron is so arranged as to allow of a fairly large magnetic leakage in order to produce the effect described in connection with Fig. 1. In other respects, the system is substantially the same.

In the system shown in Fig. 3, I have indicated a transformer 26 having an open magnetic circuit and means for varying the magnetic leakage. The core is made up of E-shaped stampings, having a central part 27, upon which the transformer windings are placed, and outer portions 28, 29 forming the return paths for the lines of force. A pivoted bar 30, having means 31 for varying its distance from the cores 27, 28, 29, forms an adjusting means for varying the leakage of the transformer. The circuit 17 is arranged to include a greater or less number of turns of the windings 18 and 19 by providing suitable taps in these windings arranged to be connected in circuit by sliders 32, 33, or similar switching arrangements. The amount of resistance and inductance in the circuit may also be controlled by means of a sliding switch arrangement 34.

The operation of the system is as follows: Upon the connection of the motor 4 with the secondary of the transformer, as by closing the switch in the motor controller 35, current will flow from the secondary of the main transformer through the winding 8 of the compensating transformer, the motor 4 and controller 35, and back over the line 24. If no lamps are included in the lamp circuit, the winding 8 will offer merely a slightly larger impedance and resistance to the flow of current than if the same were not in circuit. A certain amount of current will tend to circulate in the circuit 17, but this is of minor importance inasmuch as the speed of the motor 4 does not need to be constant or even of a definite value. If the lamps 5 were connected in the lamp circuit at the time that the motor is started, then, there would be a tendency for the additional current drawn by the motor from the secondary winding 3 of the main transformer to decrease the voltage at the terminals of the lamps. This is compensated for by the transformer 6 by means of the windings 7 and 8, as above described, and no disturbance will be produced in the lamp circuit. If, however, the number of lamps be decreased or increased, there will be a tendency for a resulting decrease or increase of current and a consequent rise or fall, respectively, of voltage. The circuit 17, containing the windings 18 and 19, tends to preserve constant the voltage on the lamp terminals through the action of the windings mounted on the transformer core. In this manner, not only can the variations of voltage upon the lamp terminals be greatly compensated for, but the inherent regulation of the circuit can thus be improved to such an extent that for substantially all loads in the motor circuit 4 and for substantially all loads in the lamp circuit, no objectionable variation in voltage impressed upon the lamps will occur. It is understood, of course, that the characteristics of compensation and regulation are contradictory and the most successful arrangement will be a compromise between the two.

It will be apparent at once that the problem which I have solved in the above system of regulation is capable of a great number of solutions, using, instead of the exact elements that I have shown, numerous variations and substitutions.

In using the above-described system to supply current to a three-wire service system, the motor circuit may be connected across the outer wires and the lamps between the neutral and the outer wires. In such case, the values for compensation and regulation will be accordingly reduced by about one-half. It is also to be noticed that the invention above described is not to be limited to systems including only motors or lamps, but broadly to all systems including constant-voltage and variable-voltage devices. In the following claims I employ the terms "constant voltage devices" and "variable voltage devices" to designate different types of apparatus. These terms are not used in their absolute sense but in a relative sense in order to entitle the claims to the broadest interpretation, which they are warranted in view of the prior art. The circuit 17 may also be employed in improving the characteristics of the ordinary potential transformer used in power service.

I consider the above-described system of distribution to be broadly new and desire that the appended claims be construed as broadly as possible.

What I claim is the following:

1. In a system of distribution, a source of electro-motive force, a constant voltage current operated device connected to said source, a variable voltage device connected to said source, and means operated by the current taken by said variable voltage device to impress a separate voltage upon said constant voltage device to transfer energy thereto, said means preventing the return of energy from said constant voltage device to said variable voltage device.

2. In a system of the class described, a source of electro-motive force, a constant voltage device, a variable voltage device, means operated by the current taken by said variable voltage device to impress an additional electro-motive force upon said constant voltage device and means for reducing the voltage drop of said means when the variable voltage device is disconnected.

3. In a system of the class described, a source of electro-motive force, a constant voltage load device, a variable voltage load device, means operated by current taken by said variable voltage load device to impress an additional electro-motive force upon said constant voltage device, said means having windings in series with the load devices and means for reducing the influence of each winding when the other is disconnected.

4. In a system of distribution, a source of electro-motive force, a constant voltage device, means connecting said constant voltage device with said source of electro-motive force, a variable voltage device, means connecting said variable voltage device to said source of electro-motive force, a connection between the mains of said variable voltage device, and said constant voltage device, said connection being asymmetric for allowing energy to be transferred from the circuit of said variable voltage device but substantially preventing energy from being transferred from the circuit of said constant voltage device to said variable voltage device.

5. The method of voltage, compensation and regulation of one branch of a split load circuit, which consists in impressing a common electro-motive force upon the load circuit; conjointly therewith impressing an electro-motive force upon one branch of the load circuit, substantially in phase with the common electro-motive force, and substantially in proportion to the amount of current drawn in another branch and simultaneously generating two electro-motive forces, by the action of the currents flowing in said load circuits, and in causing one of said electro-motive forces to overpower the other, to allow energy to be transferred from one circuit to the other.

6. The method of voltage, regulation in one branch of a transformer circuit which consists in impressing an electro-motive force upon all branches of the transformer circuit and simultaneously therewith, and substantially in phase therewith impressing an independent electro-motive force upon one branch of said transformer circuit in accordance with the current drawn in another branch of the transformer circuit, in generating opposing electro-motive forces by the current in each of said transformer circuits, and causing one of said voltages to overpower the other in order to transfer energy from one circuit to the other.

7. The method of distributing and regulating alternating current among a plurality of branch load circuits which consists in impressing a common electromotive force on all of said circuits—causing a current flow in each circuit—each current generating magnetic lines of force opposing each other—generating unequal electromotive forces by each of said opposing magnetic lines—and causing the resultant current flow to transfer energy to one of said branch load circuits.

8. The method of maintaining a uniform pressure upon a lamp load fed from a transformer in parallel with a motor load which consists in impressing a common electromotive force upon both loads—causing separate currents to flow to the lamp and to the motor—causing the motor and lamp currents to set up opposing magnetic fluxes—generating unequal voltages by said fluxes—and causing the resultant current flow to induce a separate electromotive force in the lamp circuit.

9. In combination, a source of single-phase alternating current, a load connected thereto, a winding in series with said load, a core for said winding, a second winding connected to said source independently of said first winding, an auxiliary winding embracing said first winding and energized thereby, a second auxiliary winding embracing said second winding and energized thereby, said auxiliary windings being connected together in opposition and being independent of said other windings.

10. In combination, a core, a pair of auxiliary windings thereupon, said windings having their terminals connected together, a source of current, a load, a winding in series with said load and said source, said winding being disposed in close inductive relation to one of said auxiliary windings but electrically independent of said winding, a second load and a second winding in series with said second load and said source said second winding being disposed in close inductive relation to the other of said auxiliary windings, said auxiliary windings being energized in opposition by a current in said load winding.

11. A load circuit having a plurality of branches, a common source of current for said branch loads, a transformer having a pair of windings, a winding of said pair being connected in series relation to one of said branch-load circuits, said windings when energized energizing the core in opposite directions, an auxiliary winding disposed in close inductive relation to one of said load circuits, a second auxiliary winding disposed in close inductive relation to the other of said load circuits, said windings having their terminals connected directly together in a closed circuit.

12. In a system of the class described, a winding, means to generate in said winding an electromotive force, a circuit connected to said winding, a plurality of branch circuits connected to said circuit, means in one of said branch circuits for creating an independent electromotive force in another one of said branch circuits, and a closed circuit inductively related to both of said branch circuits.

13. A system of the class described, a winding, means to generate in said winding an electromotive force, a circuit connected to said winding, a plurality of branch circuits connected to said circuit, means in each of said branch circuits for influencing the voltage of the remaining branch circuits, and means for preventing the transfer of energy from one of said influenced circuits to the influencing circuit.

14. In a system of the class described, a winding, means to generate therein an electromotive force, a circuit connected to said winding, a branch circuit connected to said circuit, said branch including a variable voltage load and a winding in series therewith, a second branch circuit connected to said circuit, said second branch including a constant voltage load, and a winding in series therewith, an iron core connecting said windings, and a closed circuit having windings in close inductive relation to the windings of said branch circuit said closed circuit windings being disposed on said core and energized simultaneously in opposite directions.

15. In a system of the class described, common feeder mains, a pair of branch load circuits connected to said mains, a magnetic core, means in each of said branch circuits inductively related to said core, means in each circuit for varying the amount of current flowing in the corresponding circuit, and a closed circuit having a pair of windings in inductive relation to said magnetic core each of said pair of windings being individual to one of said branch load circuits.

16. In a system of the class described, common feeder mains, a pair of branch load circuits connected to said mains, a magnetic core, windings in each of said branch circuits inductively related to said core, means in said circuit for varying the amount of current flowing in said circuit, and a pair of separate windings on said magnetic core in inductive relation to said branch circuits, said separate windings being connected directly together in a closed circuit and energized in opposition by the windings in said branch-load circuits.

17. In combination, a transformer core, a pair of windings disposed on said core to permit of relatively high magnetic leakage between said windings, another pair of windings disposed on said core in close inductive relation to said first pair of windings, said second windings being independent electrically of said first pair of windings and connected together in opposition, and means to impress a common single-phase alternating electro-motive force upon said first pair of windings simultaneously to energize the same.

18. In combination, a core having two limbs, a source of single-phase alternating current, a winding on one limb connected in series with said source of current, a second winding on the other limb, a load connected to said second winding, an auxiliary winding in close inductive relation with said first winding, another auxiliary winding in close inductive relation to said second winding, said auxiliary windings being at all times independent of said windings and being connected directly together in a closed circuit.

19. In combination a core having two limbs, a winding on one limb, a source of single-phase alternating current supply for said winding, an independent winding on said second limb, said second winding being connected to the same source of current supply in parallel relation to said first winding, auxiliary windings for each of said limbs, said auxiliary windings being independent of said windings and being connected together in opposition.

20. In combination a core having two limbs, a winding on one limb, a source of current supply connected to said winding, a winding on said other limb, said second winding being adapted to be connected to a load device, auxiliary windings for each of said limbs, said auxiliary windings being connected together in opposition, one of said auxiliary windings comprising a greater number of turns than the other.

21. In combination a core having two limbs, a winding on one limb, a source of current supply connected to said winding, a winding on said other limb, said second winding being adapted to be connected to a load device, auxiliary windings for each of said limbs, said windings being connected together in opposition, said windings being unequal in effective number of turns.

22. In combination a core, a winding on said core, a source of current supply connected to said winding, a second winding on said core, a working circuit connected to said second winding, auxiliary windings electrically independent of said windings in close inductive relation to each of said windings, said auxiliary windings comprising an unequal number of effective turns and being connected together in opposition in a constantly-closed circuit.

23. In combination a core, a winding on said core, a working circuit connected in series with said winding, a second winding on said core, a separate working circuit connected in series with said second winding, a common source of single-phase current supply connected to said windings, auxiliary windings in close inductive relation to each of said windings, said auxiliary windings being connected together in opposition and means to vary the effective number of turns of the windings.

24. In combination a core, a winding upon said core, a source of current connected to said winding, a second core, an independent winding upon said second core, a load circuit connected to said second winding, an auxiliary winding upon said first core, an auxiliary winding upon said second core, said auxiliary windings comprising an unequal number of effective turns being connected directly together in opposition and means to vary the effective number of turns of the windings, said auxiliary windings being independent of said other windings.

25. In combination a common source of single-phase alternating current, a load, a winding in series with said source and said load, a second load, a second winding inductively related to said first winding and being in series with said common source and said second load and a pair of windings in close inductive relation to said first and said second windings respectively, said pair of windings being connected together in series and being energized substantially simultaneously in opposition.

26. In combination, a core having two limbs, a winding on one limb, a source of current supply connected to said winding, a winding on said other limb, said second winding being adapted to be connected to a load device, auxiliary windings for each of said limbs, said auxiliary windings being connected together in opposition, and a resistance shunted across said first winding.

27. In combination, a core having two limbs, a winding on one limb, a source of current supply connected to said winding, a winding on said other limb, said second winding being adapted to be connected to a load device, auxiliary windings for each of said limbs, said windings being unequaled in effective number of turns and being connected together in opposition, and a regulating shunt across said first winding.

28. In combination, a core having two limbs, a winding on one limb, a source of current supply connected to said winding, a winding on said other limb, said second winding being adapted to be connected to a load device, auxiliary windings for each of said limbs, said auxiliary windings being connected together in opposition, and a regulating resistance shunted across one of said auxiliary windings.

29. In combination, a core having two limbs, a winding on one limb, a source of current supply connected to said winding, a winding on said other limb, said second winding being adapted to be connected to a load device, auxiliary windings for each of said limbs, said windings being unequal in effective number of turns and being connected together in opposition, and a regulating shunt connected across one of said auxiliary windings.

30. In combination, a core having two limbs, a winding on one limb, a regulating shunt connected across said winding, a source of current supply connected to said winding, a winding on said other limb, said second winding being adapted to be connected to a load device, auxiliary windings for each of said limbs, said auxiliary windings being connected together in opposition, and a regulating shunt for one of said auxiliary windings.

In witness whereof, I hereunto subscribe my name this 27th day of August, A. D. 1914.

EDMUND O. SCHWEITZER.

Witnesses:
LEONARD W. NOVANDER,
CAMERON A. WHITSETT.